(12) United States Patent
Li et al.

(10) Patent No.: US 11,461,971 B1
(45) Date of Patent: Oct. 4, 2022

(54) SYSTEMS AND METHODS FOR INTERACTIVELY EXTRAPOLATING BREAKLINES OVER SURFACES

(71) Applicant: Cesium GS, Inc., Philadelphia, PA (US)

(72) Inventors: Kangning Li, North Wales, PA (US); Hannah Pinkos, West Chester, PA (US); Joshua Lawrence, Media, PA (US); Sean Lilley, Exton, PA (US)

(73) Assignee: CESIUM GS, INC., Philadelphia, PA (US)

( * ) Notice: Subject to any disclaimer, the term of this patent is extended or adjusted under 35 U.S.C. 154(b) by 0 days.

(21) Appl. No.: 17/384,689

(22) Filed: Jul. 23, 2021

Related U.S. Application Data

(60) Provisional application No. 63/165,911, filed on Mar. 25, 2021.

(51) Int. Cl.
  *G06T 19/00* (2011.01)
  *G06T 17/05* (2011.01)
(52) U.S. Cl.
  CPC .............. *G06T 19/00* (2013.01); *G06T 17/05* (2013.01)
(58) Field of Classification Search
  CPC ....... G06T 17/05; G06T 17/20; G06T 19/006; H04N 19/117; H04N 19/523; G06F 17/18; G06F 17/175
  See application file for complete search history.

(56) References Cited

U.S. PATENT DOCUMENTS

| | | | | |
|---|---|---|---|---|
| 10,644,657 | B1* | 5/2020 | Megretski | H03F 3/24 |
| 2008/0079729 | A1* | 4/2008 | Brailovsky | G06K 9/6211 |
| | | | | 345/443 |
| 2008/0133982 | A1* | 6/2008 | Rawlins | H03F 1/3294 |
| | | | | 714/699 |
| 2009/0248305 | A1* | 10/2009 | Nakano | G06T 7/70 |
| | | | | 701/514 |
| 2012/0013492 | A1* | 1/2012 | Mclachlan | H03M 1/1047 |
| | | | | 341/118 |
| 2016/0092004 | A1* | 3/2016 | Yoshiki | G06F 3/047 |
| | | | | 345/174 |
| 2019/0348956 | A1* | 11/2019 | Megretski | H03F 1/3258 |
| 2020/0253667 | A1* | 8/2020 | Fouts | A61B 34/25 |

OTHER PUBLICATIONS

Virtual•surveyor, "Guided Breakline Drawing", "https://www.youtube.com/watch?v=qhSoLobEYDg" (Jun. 1, 2016).

* cited by examiner

*Primary Examiner* — Abderrahim Merouan
(74) *Attorney, Agent, or Firm* — The Marbury Law Group, PLLC

(57) ABSTRACT

Systems, methods, devices, and non-transitory media of the various embodiments may provide for extrapolating a breakline for a user in a graphical application, such as an Earthworks rendering application. Various embodiments may enable a breakline to be extrapolated and rendered on a surface from two or more points selected by a user on that surface. In various embodiments, the surface may be any type directional surface, such as a triangle mesh, pointcloud, heightmap, fusions of such surfaces, etc.

24 Claims, 19 Drawing Sheets

SYSTEMS AND METHODS FOR INTERACTIVELY EXTRAPOLATING BREAKLINES OVER SURFACES

RELATED APPLICATIONS

This application claims priority to U.S. Provisional Application No. 63/165,911 entitled "Systems and Methods for Interactively Extrapolating Lines Over Surfaces" filed on Mar. 25, 2021, the entire contents of which are hereby incorporated by reference for all purposes.

BACKGROUND

Computer graphics, and especially three-dimensional (3D) visualization, is a rapidly developing computing technology finding new applications in many different industries, including geospatial, defense, entertainment, and construction.

3D Digital Earth and Geographic Information System (GIS) software often includes the ability to render models of terrain as a map of heights of the Earth's surface. Such large-area terrain models are desirable because they provide global context even for applications that are primarily concerned with localized (within several kilometers) areas.

SUMMARY

The systems, methods, devices, and non-transitory media of the various embodiments may provide for automatically extrapolating next points in a breakline in a graphical application, such as an Earthworks rendering application. Various embodiments may enable a breakline to be extrapolated and rendered on a surface from two or more points selected by a user on that surface. In various embodiments, the surface may be any type directional surface, such as a triangle mesh, pointcloud, heightmap, fusions of such surfaces, etc.

Various embodiments may include a method for extrapolating a breakline over a surface in a graphical rendering application, which includes receiving a user input of a first point of the surface and a user input of a second point on the surface, extending a rendered line between the first point and the second point, computing a series of points on the surface in an arc around the second point, computing a potential line segment sample for each of the series of arc points, identifying, from among the computed potential line segment samples, a best line segment sample based on a goal, selecting the arc point corresponding to the identified best line segment sample, and extending the rendered line from the second point to the selected arc point. In various embodiments, the second point on the surface may be selected later in time than the first point.

Various embodiments may further include determining whether a stop condition is reached, and in response to determining that a stop condition is not reached, updating the goal based at least in part on the identified best line segment sample, and computing a series of points on the surface in an arc around a most recent point to which the rendered line was extended.

In various embodiments, determining whether a stop condition is reached may include determining if a predetermined point count, maximum distance, or surface boundary has been reached in the graphical rendering application. In various embodiments, identifying a best line segment sample based on a goal may include identifying a potential line segment sample having a sample perpendicular angle with the smallest difference from a perpendicular angle of the rendered line.

Various embodiments may further include calculating a perpendicular angle of the rendered line by computing a forward direction of the rendered line based on the user input of the first and second points, computing a surface ray representing an up direction at each of the first and second points, and, for each of the first and second points, computing a location of a surface probe sent in a left direction from the point and a location of a surface probe sent in a right direction from the point, and computing an angle formed by a vector from the point to the left probe location and a vector from the point to the right probe location. Various embodiments may further include combining the computed angles for the first and second points to generate the perpendicular angle. In some embodiments, the left and right probe locations may be calculated based on at least the forward direction and the surface ray representing the up direction at that point.

In some embodiments, combining the computed angles for the first and second points may include averaging the computed angles. In various embodiments, computing the potential line segment sample may include, for each of the series of arc points, identifying a forward direction as from the second point to the arc point, identifying a surface up direction at the arc point, computing a vector from the arc point to a projected left probe location and a vector to a projected right probe location based on at least the forward direction and the surface up direction, and computing a sample perpendicular angle as an angle between the vectors to the projected left probe and right probe locations at the arc point.

In some embodiments, at least one of the radius of the arc or the length of the arc may be based on the user input points. In some embodiments, at least one of the radius of the arc or the length of the arc may be fixed. In some embodiments, the graphical rendering application comprises an Earthworks application.

Various embodiments may further include receiving additional user input points, wherein the extrapolation of the rendered line is modified based on the received additional user input points. In some embodiments, the surface may be a heightmap, triangle mesh, pointcloud, implicit surface, or any combination thereof.

Various aspects include a device including a processor configured with processor-executable instructions to perform operations of any of the methods summarized above. Various aspects also include a non-transitory processor-readable medium on which is stored processor-executable instructions configured to cause a processor of a device to perform operations of any of the methods summarized above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The term "computing device" as used herein refers to any one or all of cellular telephones, smartphones, personal or mobile multi-media players, personal data assistants (PDA's), laptop computers, personal computers, servers, tablet computers, smartbooks, ultrabooks, palm-top computers, multimedia Internet enabled cellular telephones, and similar electronic devices that include a memory and a programmable processor. While specific examples are listed above, the various embodiments are generally useful in any electronic device that includes a processor and executes application programs. Computing devices may include more than one type of processor. For example, a computing device may include a central processing unit (CPU) and a graphics processing unit (GPU). A CPU typically includes a limited number of cores with relatively larger cache memory capability and is often configured to support serial processing tasks. A GPU typically includes many cores with limited cache memory and can handle processing of many threads, such as thousands of threads, in parallel. CPUs and GPUs often work together to handle processing operations, especially image rendering, such as image rendering enabled by 3D Digital Earth and GIS software.

The various embodiments provide autocomplete suggestions for a user drawing lines defining terrain features in an earthworks application. These lines, referred to herein as "breaklines" or "outlines," and may be around the bases of stockpiles, along the edges of cliffs, along the sides of trenches, and along switchback roads going up steep slopes.

Figure 1:
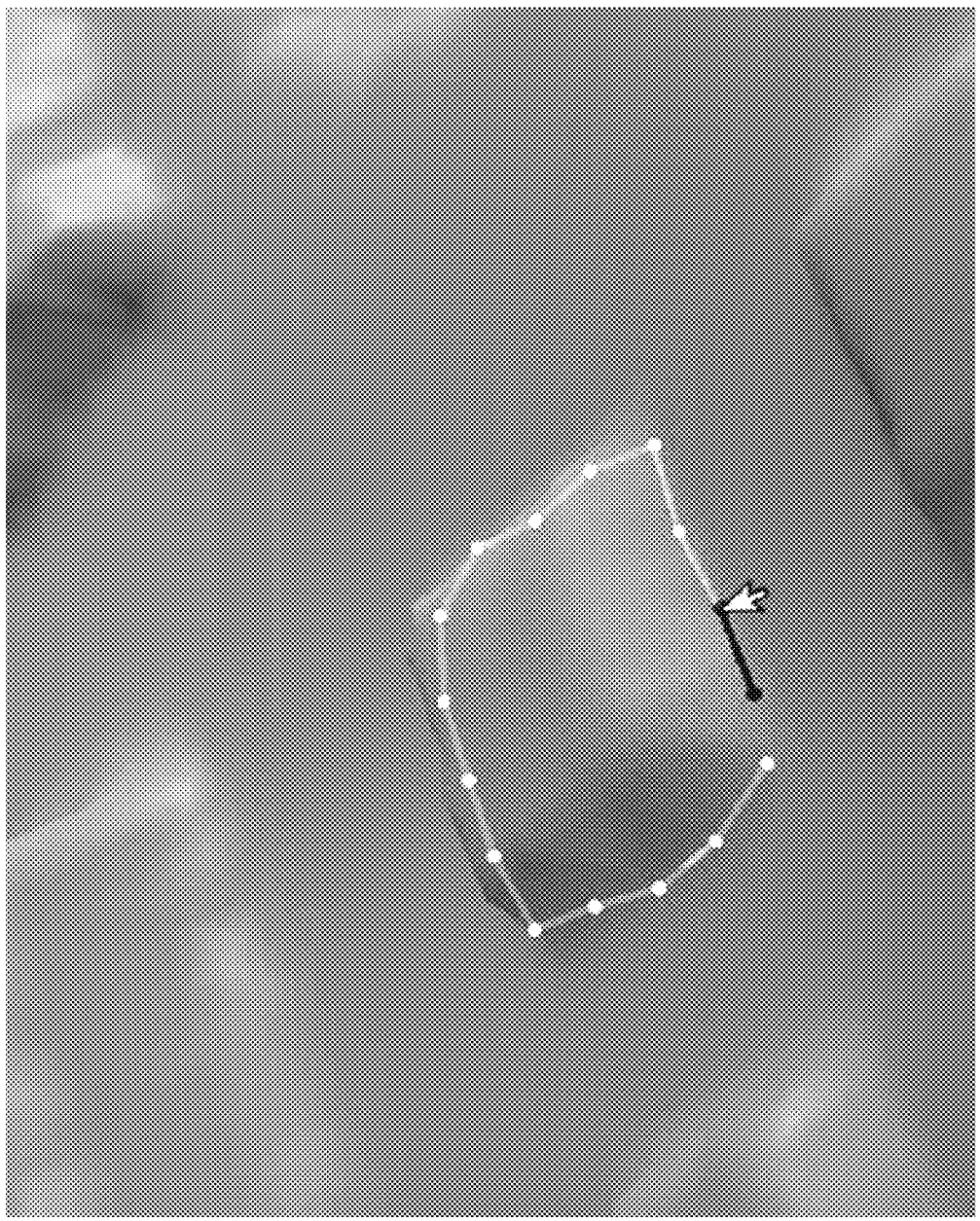
FIG. 1 illustrates an example rendering of a breakline around the base of a stockpile according to various embodiments.
Figure 2:
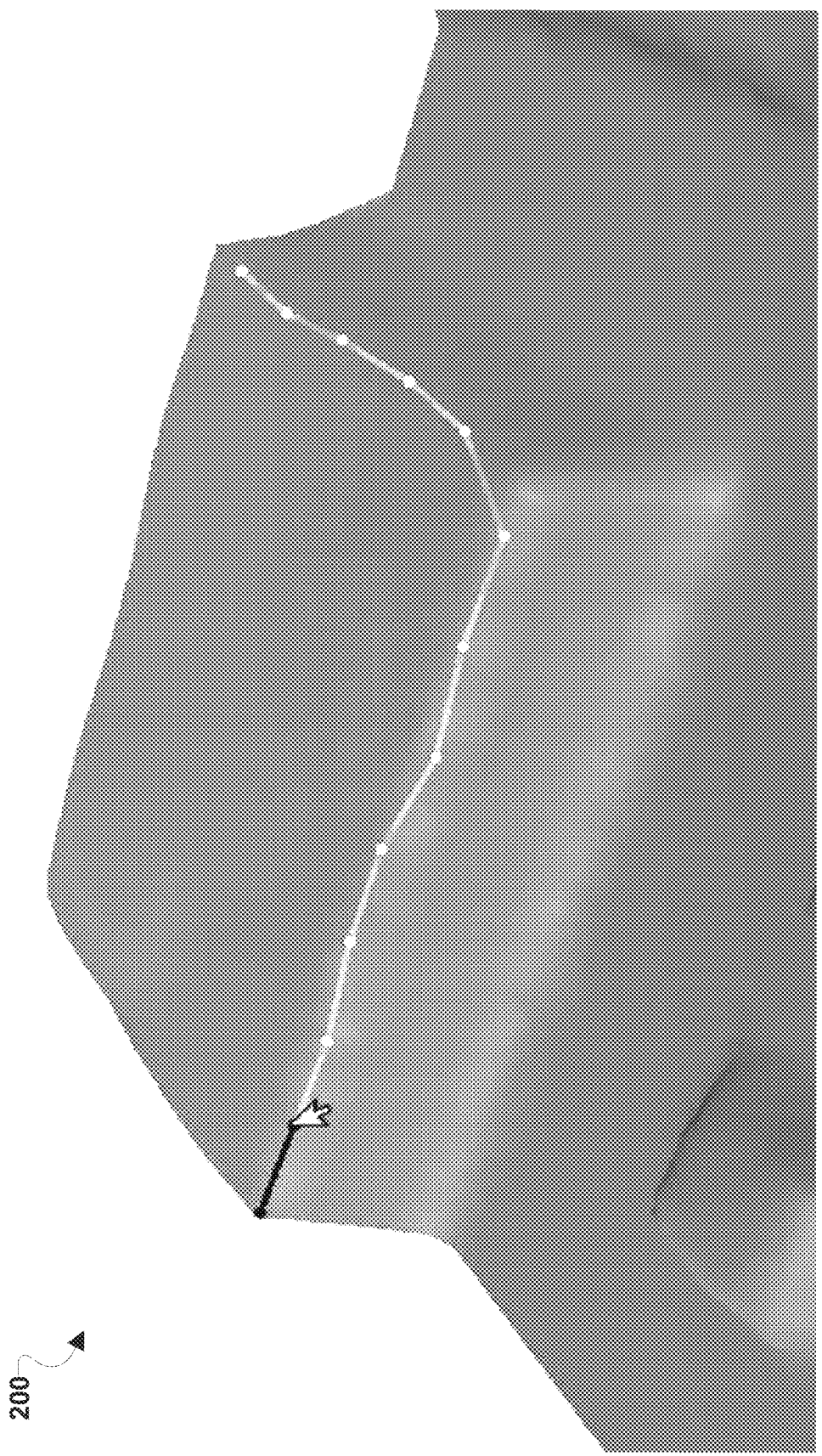
FIG. 2 illustrates an example rendering of a breakline along the edge of a cliff according to various embodiments.
Figure 3:
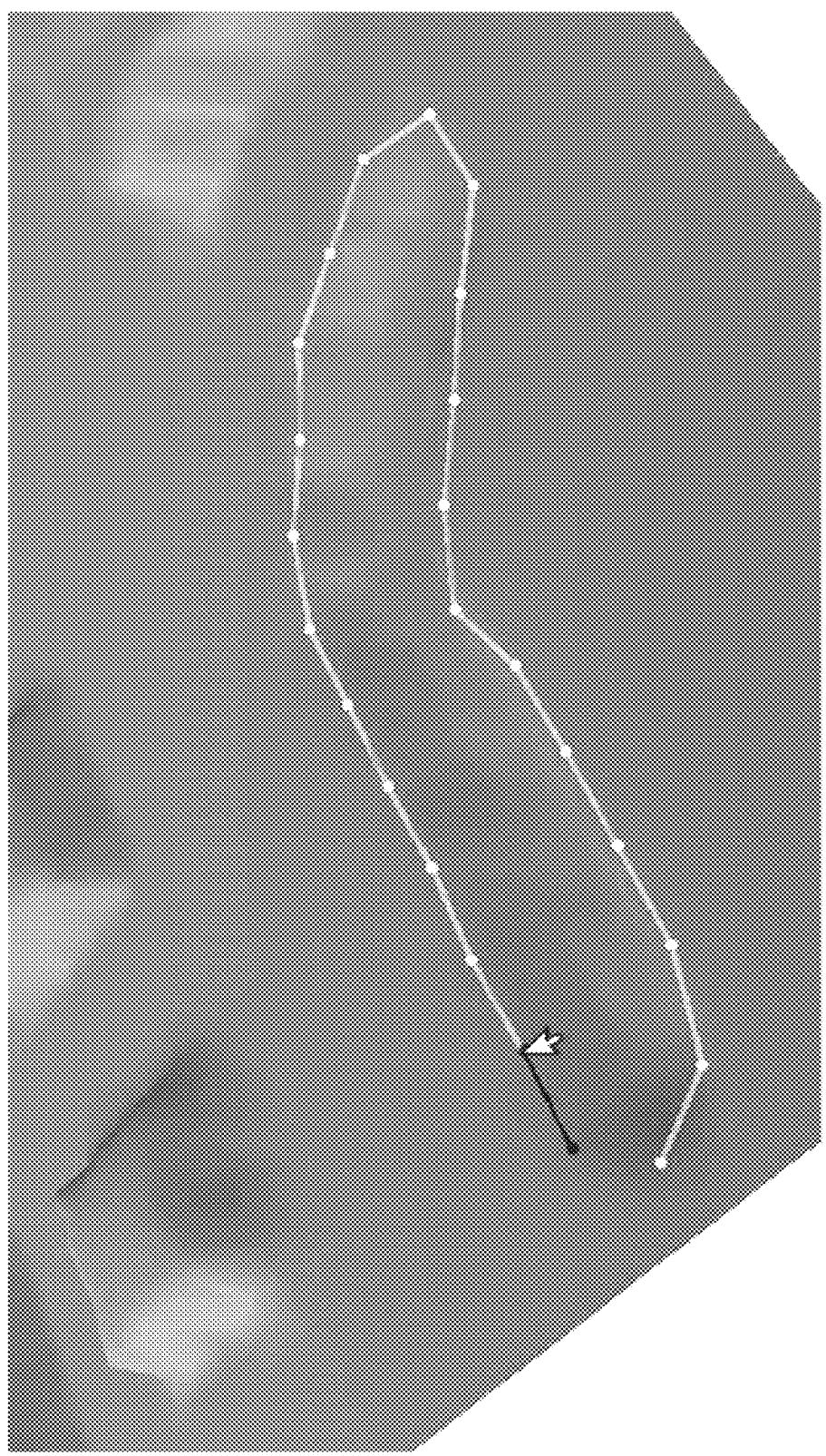
FIG. 3 illustrates an example rendering of a breakline around a trench according to various embodiments.
Figure 4:
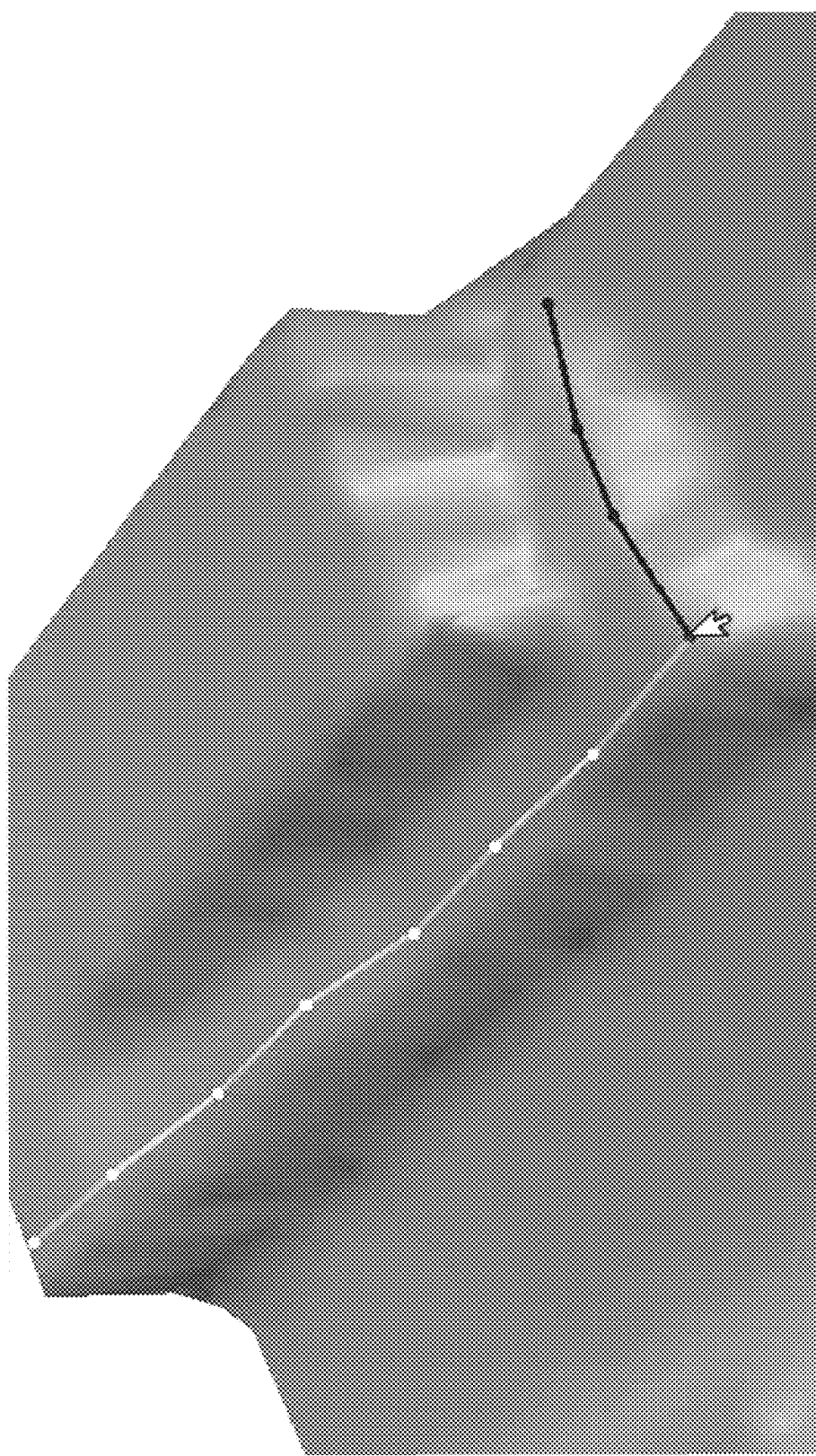
FIG. 4 illustrates an example rendering of a breakline along a road going up the side of a cliff according to various embodiments.

FIGS. 1-4 illustrate example renderings of breaklines according to the various embodiments. The two dark points are the points drawn or otherwise input by the user on the surface, or by the user accepting extrapolated points, with a rendered line between the two points. The cursor position indicates the current endpoint of the rendered breakline. The other points are the extrapolated outline extended from the two user selected points automatically according to the various embodiments. FIG. 1 illustrates an outline 100 around the base of a stockpile according to various embodiments. Points behind the stockpile are drawn to show through the surface. FIG. 2 illustrates an outline along the edge of a cliff according to various embodiments. FIG. 3 illustrates an outline around a trench according to various embodiments. FIG. 4 illustrates an outline along a road going up the side of a cliff according to various embodiments.

However, the embodiment systems and methods are not necessarily limited to earthworks applications, and may also be useful for tracing creases and other features on other 3D surfaces as long as a method is provided for indicating a direction that is "out" of a surface when given a position on the surface. The embodiment methods provide of an algorithm for automatically computing extrapolated next surface data points based on some user input, and a system for the user to draw with extrapolated suggestions by either accepting a portion of the automatically computed points or supplying additional points as input if the autocompleted breakline is not satisfactory. The interaction in this method can save user labor if the user has to click many points, for example, points at an interval of one meter over the length of a 30 meter road.

The methods of the various embodiments may be applied to many different types of surface data, including triangle meshes, pointclouds, heightmaps, and implicit surfaces, so long as the system able to get the direction "out" of the mesh at a given point near the surface. The various embodiment methods may also benefit from a way for computing the shortest distance from a point to the surface, which can be used with the direction "out" to move the point onto the mesh surface. In an Earthworks application the surface may be a fusion of triangle meshes, pointclouds, and heightmaps. In particular, the direction "out" of the surface in various embodiments may always be "up," and the "shortest distance" may be analogous to the difference between the height of a point the height on the surface at the same 2D location.

Figure 5:
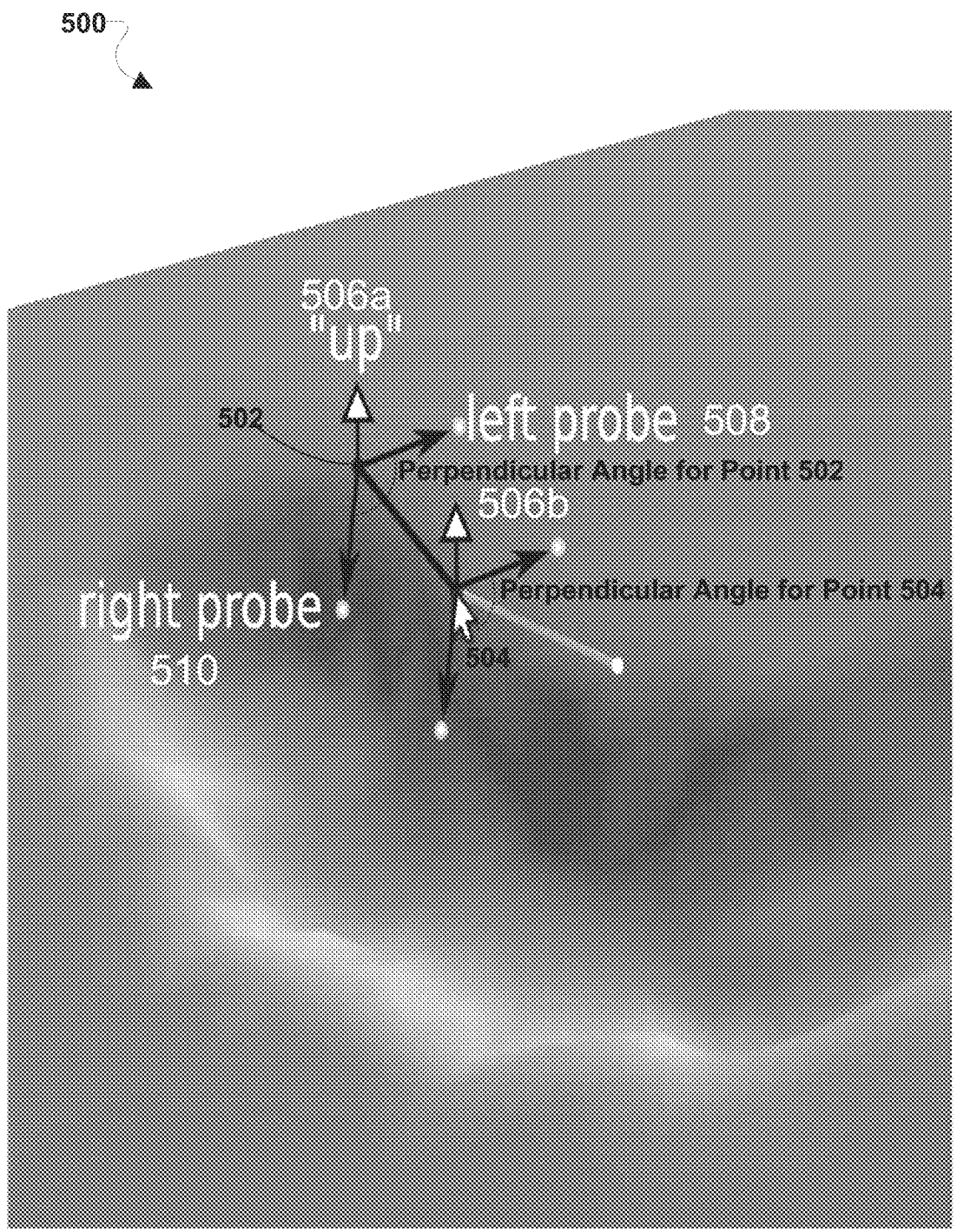
FIG. 5 illustrates two user-selected points on a surface in a rendered line for extrapolation according to various embodiments. probes directions and "up" vector for user-provided points.

In various embodiments, an algorithm may automatically extrapolate a next point in a breakline (i.e., outline defining terrain features) on a surface, so long as the user inputs two or more points on the surface to create an initial rendered line segment. In the various embodiments, the user input points are assumed to be along a breakline. For example, FIG. 5 illustrates a terrain map 500 with a first user-supplied point 502 and a second user input point 504. In various embodiments, a "forward" direction of the breakline may be computed based on the user input points 502, 504. For example, the second user input point 504 may have been created later in time than the first user input point 502, and therefore may be considered the current endpoint of the breakline for purposes of computing the forward direction of the breakline. The system may also compute an "up" direction for each of the user input points 502, 504. In various embodiments, the "up" direction, represented by surface rays 506, may be the "up" direction in an earthworks application, or may be surface normal (i.e., that approximately points away from a surface of the Earth) in other 3D applications.

For each of the user input points 502, 504, the system may also compute location points of two probes on the surface sent in the left and right directions. For example, for the user input point 502, the system may compute a left probe location 508 and a right probe location 510. In various embodiments, the positions of the left and right probes for each user input point may be computed based on the forward direction and the up ray at that point. In various embodiments, the probe distance may be computed based on the distances between the user input points, or another parameter (e.g., heightmap resolution, average inter-point distance for triangle meshes, etc.).

In various embodiments, for each user input point, a perpendicular angle may be computed as the angle formed by the vector from the user input point (e.g., 502) to the left probe location (e.g., 508) and the vector from the user input point (e.g., 502) to the right probe location (e.g., 510). In various embodiments, the perpendicular angles at the user input points 502, 504 may be used as a goal for generating subsequent potential sample points to extrapolate the breakline.

Figure 6A:
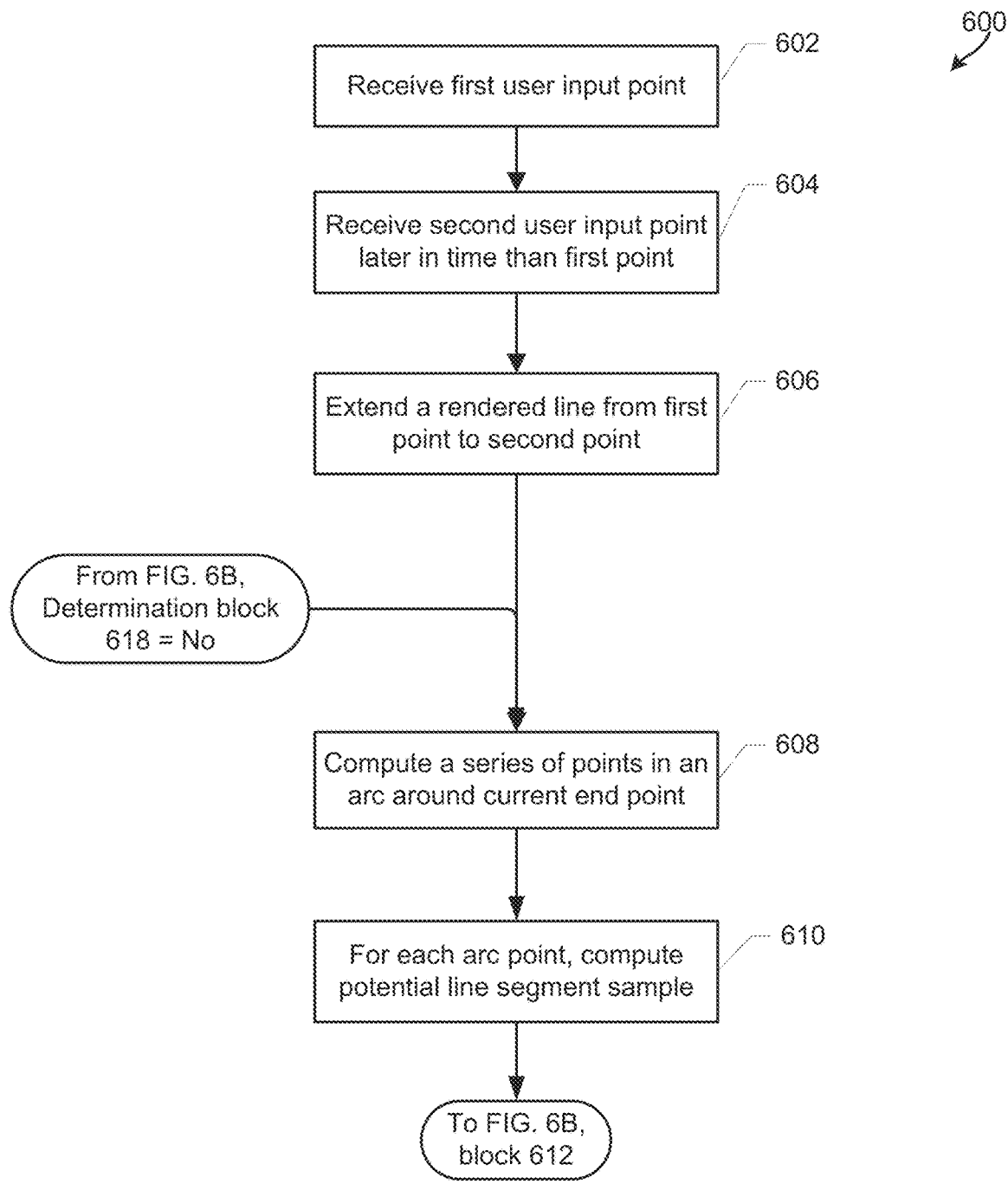
FIGS. 6A and 6B are a process flow diagram illustrating an embodiment method for extrapolating a next point in a breakline from two or more points selected by a user on that surface.
Figure 6B:
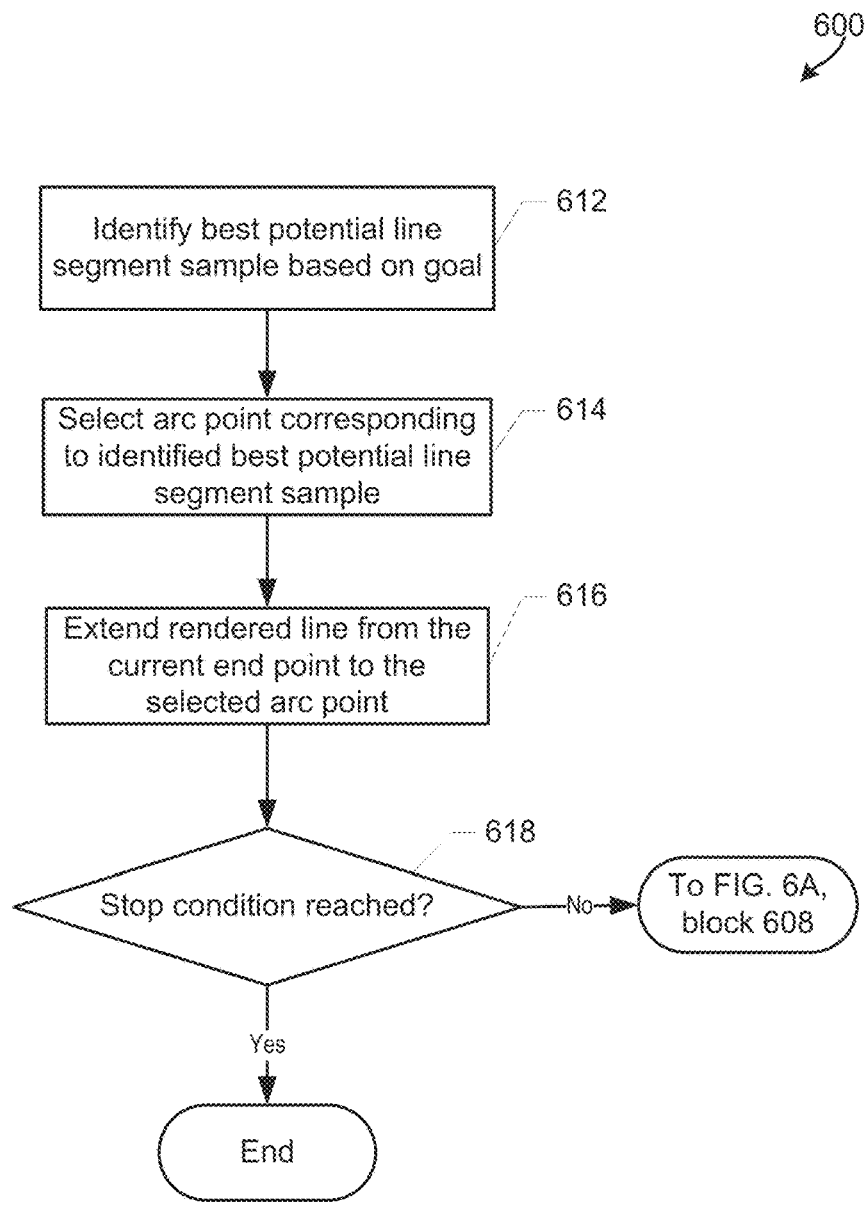

FIGS. 6A-6B are a process flow diagram illustrating an embodiment method 600 for automatically extrapolating a next point for a breakline on a surface using based on two user input points. In various embodiments, the operations of method 600 may be performed by one or more component of a computing device individually and/or working together, such as a CPU, a GPU, etc.

In block 602, the component of the computing device (e.g., the CPU and/or the GPU) may receive a first user input point (e.g., 502 in FIG. 5). In various embodiments, user input may be received through any of a variety of interface devices (e.g., touchscreen, keyboard, etc.). In block 604, the component of the computing device (e.g., the CPU and/or the GPU) may receive a second user input point (e.g., 504 in FIG. 5) that is later in time than the first user input point. In block 606, the component of the computing device (e.g., the CPU and/or the GPU) may extend a rendered line from the first user input point to the second under input point.

Figure 7A:
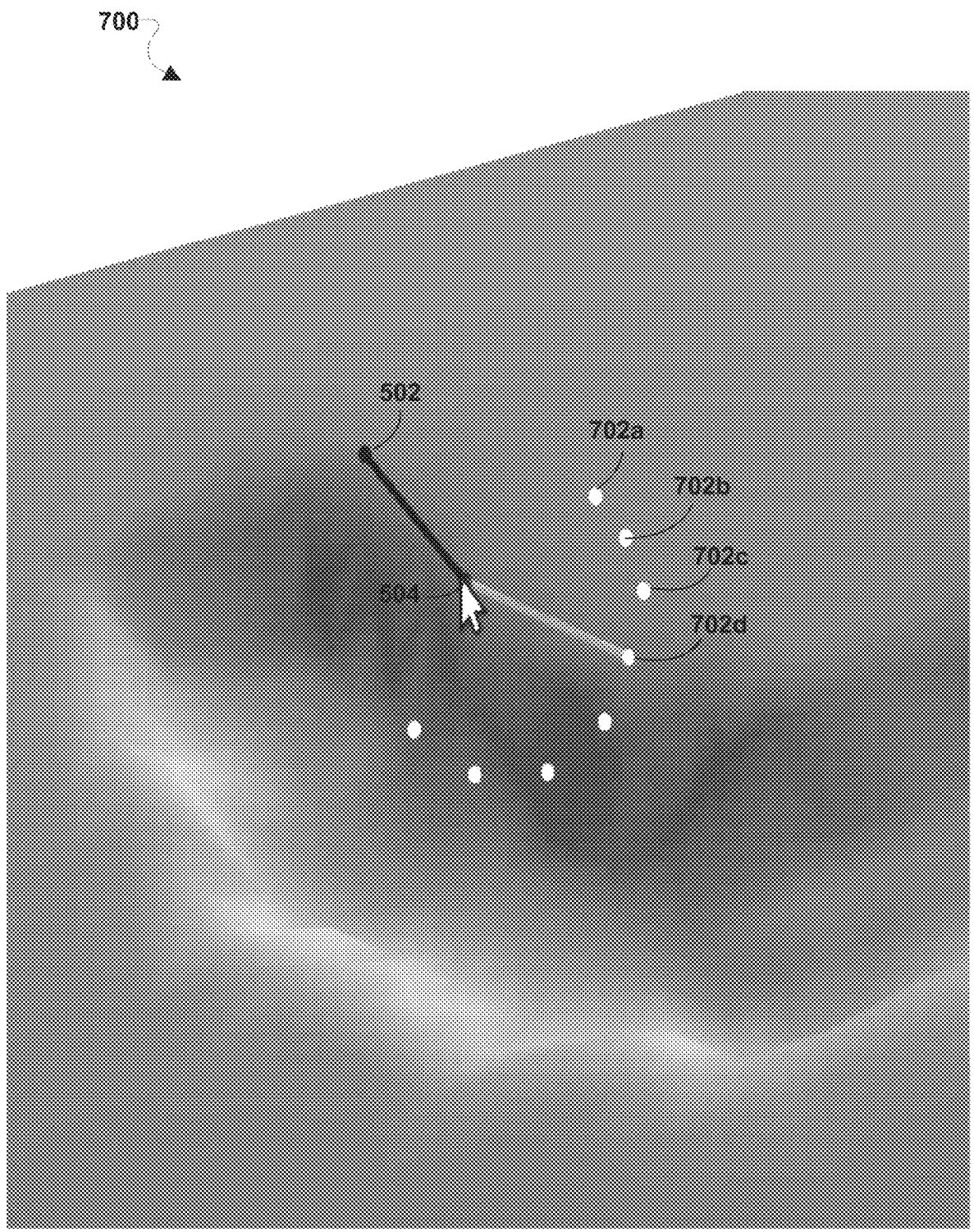
FIG. 7A illustrates a series of points in an arc around the second user selected point used in embodiments of the method of FIGS. 6A-6B.

In block 608, the component of the computing device (e.g., the CPU and/or the GPU) may compute a series of points in an arc around the end point of the rendered breakline. In particular, in the first pass of the method 600, the current end point may be the second user input point (e.g., 504). In various embodiments, the radius of the arc may be a fixed distance, or may be based on the average distance between the user input points. If the surface ray representing the "up" direction varies from point-to-point (i.e., between 506a and 506b in FIG. 5), the orientation of the series of points in the arc may be adjusted based on the surface ray 506b. For example, FIG. 7 illustrates an example representation 700 of a series of points 702 in an arc around the second user input point 504, some of which are labeled (e.g., 702a-d).

In block 610, the component of the computing device (e.g., the CPU and/or the GPU) may compute, for each arc point, a potential line segment sample. In various embodiments, the potential line segment sample may be a line projected between the second user input point (e.g., 504) and the arc point. In various embodiments, computing the potential line segment sample for each arc point may also include computing a perpendicular angle in the same manner discussed above with respect to the first and second user input points, which described in further detail below with respect to FIG. 6B.

In block 612, the component of the computing device (e.g., the CPU and/or the GPU) may identify the best potential line segment sample based on an existing goal. In some embodiments, the existing goal may be a perpendicular angle that is the most similar to the average of the perpendicular angles for all of the user input points (e.g., 502, 504). In some embodiments, the system may compute an average that gives different weights on the perpendicular angles depending on how close the corresponding user input point is to the end of the breakline. In block 614, the component of the computing device (e.g., the CPU and/or the GPU) may select the arc point corresponding to the identified best potential line segment sample.

Figure 7B:
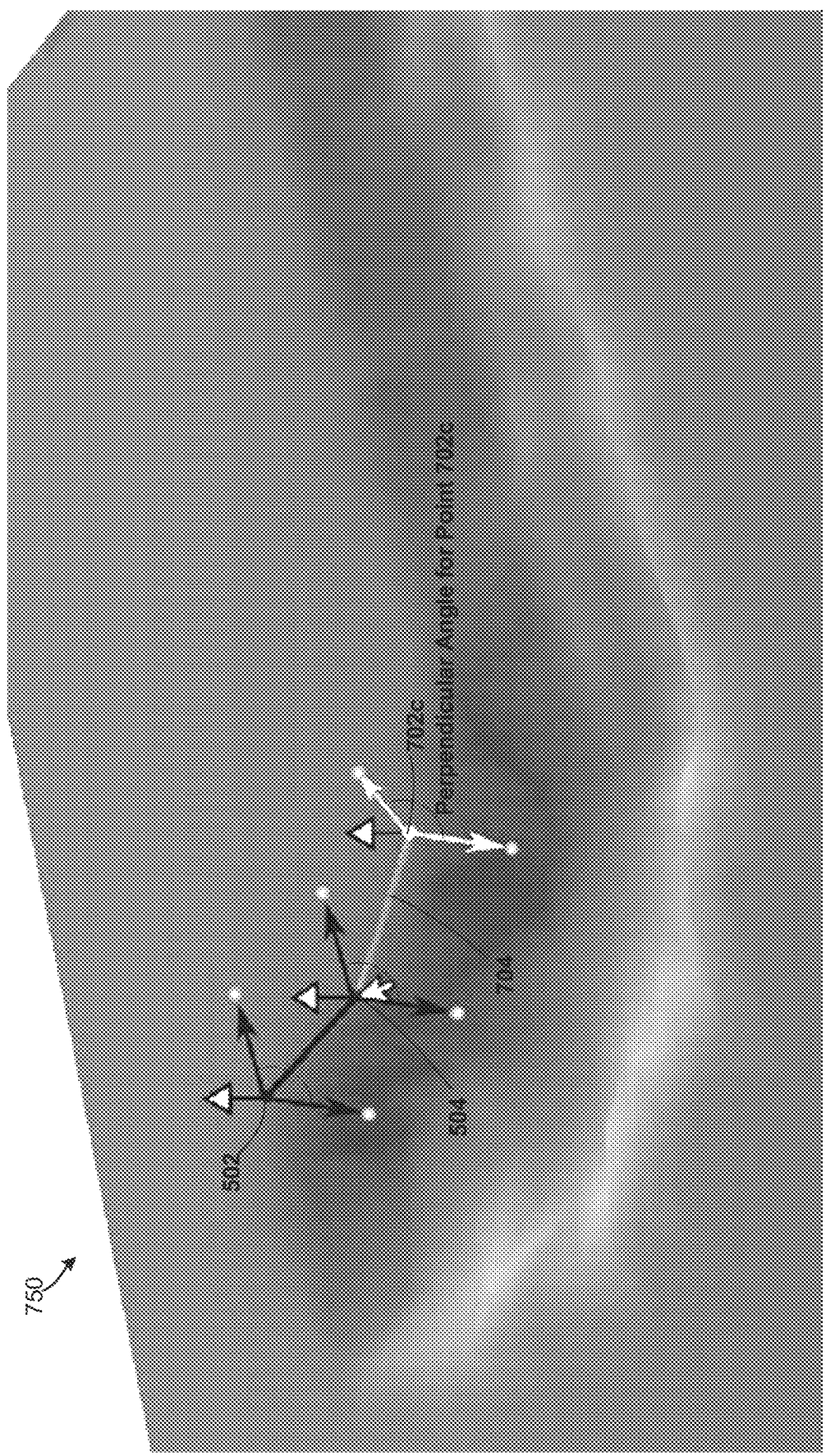
FIG. 7B illustrates selection of an arc point corresponding to the identified best potential line segment sample in FIGS. 6A-6B according to various embodiments.

FIG. 7B illustrates an example surface map 750 showing identification of a best potential line segment sample 704 and corresponding arc point 702c. Specifically, among the arc points 702, perpendicular angle at arc point 702c, computed based on the "up" surface ray and the vectors to the projected left and right probe locations (calculated from on the "up" surface ray and forward direction at point 702c), is most similar to the average of the perpendicular angles for the user input points (e.g., 502, 504).

In block 616, the component of the computing device (e.g., the CPU and/or the GPU) may extend the rendered line from the current end point to the selected arc point (e.g., 702c). For example, the current endpoint during the first pass of method 600 may be the second user input point (e.g., 504).

In some embodiments, following selection of the arc point and extension of the rendered breakline to the arc point as a new end point, the goal parameters may be updated. For example, the perpendicular angle at the selected arc point may be added to the angles used to compute the average of perpendicular angles for user input points, to which potential samples are subsequently compared.

In some embodiments, arc points may also be disqualified for various reasons, such as too much of an elevation change versus the previous point, or too rapid of a direction change.

Figure 8:
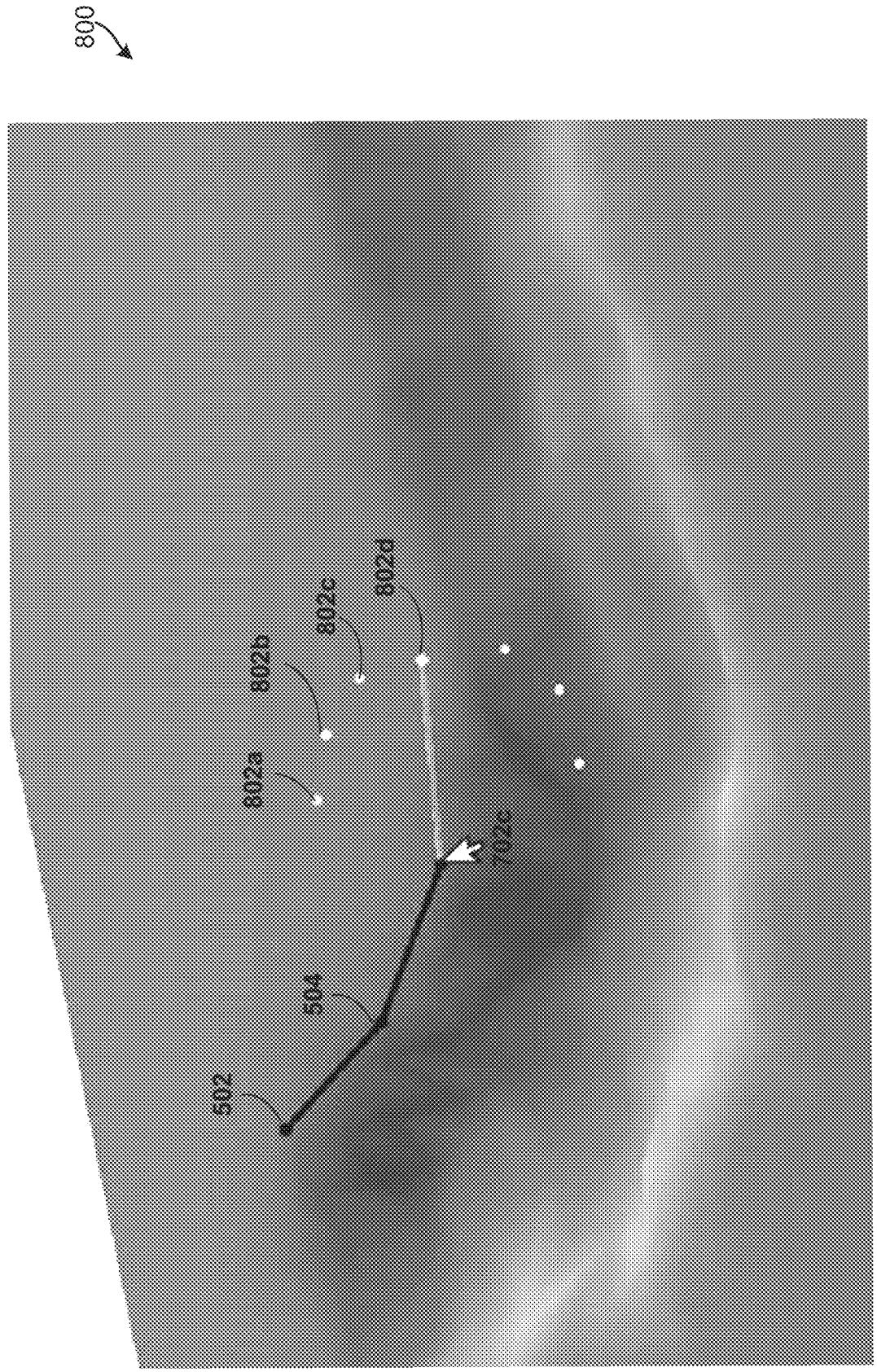
FIG. 8 illustrates an extension of a breakline using extrapolation methods according to various embodiments.

As shown in the surface map 800 of FIG. 8, the breakline has been extended to a new end point 702c. In some embodiments, such extension of the breakline may be accomplished by the user's acceptance of an extrapolated next end point (e.g., 702c) based on the identified best potential line segment sample (e.g., 704 in FIG. 7). In determination block 618, the component of the computing device (e.g., the CPU and/or the GPU) may determine whether a stop condition has been met. Such stop condition may be, for example, reaching a maximum distance or point count, reaching an edge or surface boundary, etc.

In response to determining that a stop condition has been reached (i.e., determination block 618="Yes"), the component of the computing device (e.g., the CPU and/or the GPU) may end the method 600. In response to determining that a stop condition has been reached (i.e., determination block 618="No"), the component of the computing device (e.g., the CPU and/or the GPU) may return to block 608 to repeat the method 600 based on the new current end point. For example, the surface map 800 in FIG. 8 shows an example series of points 802 in an arc around the current end point 702*c*, some of which are labeled (e.g., 802*a-d*).

Figure 9:
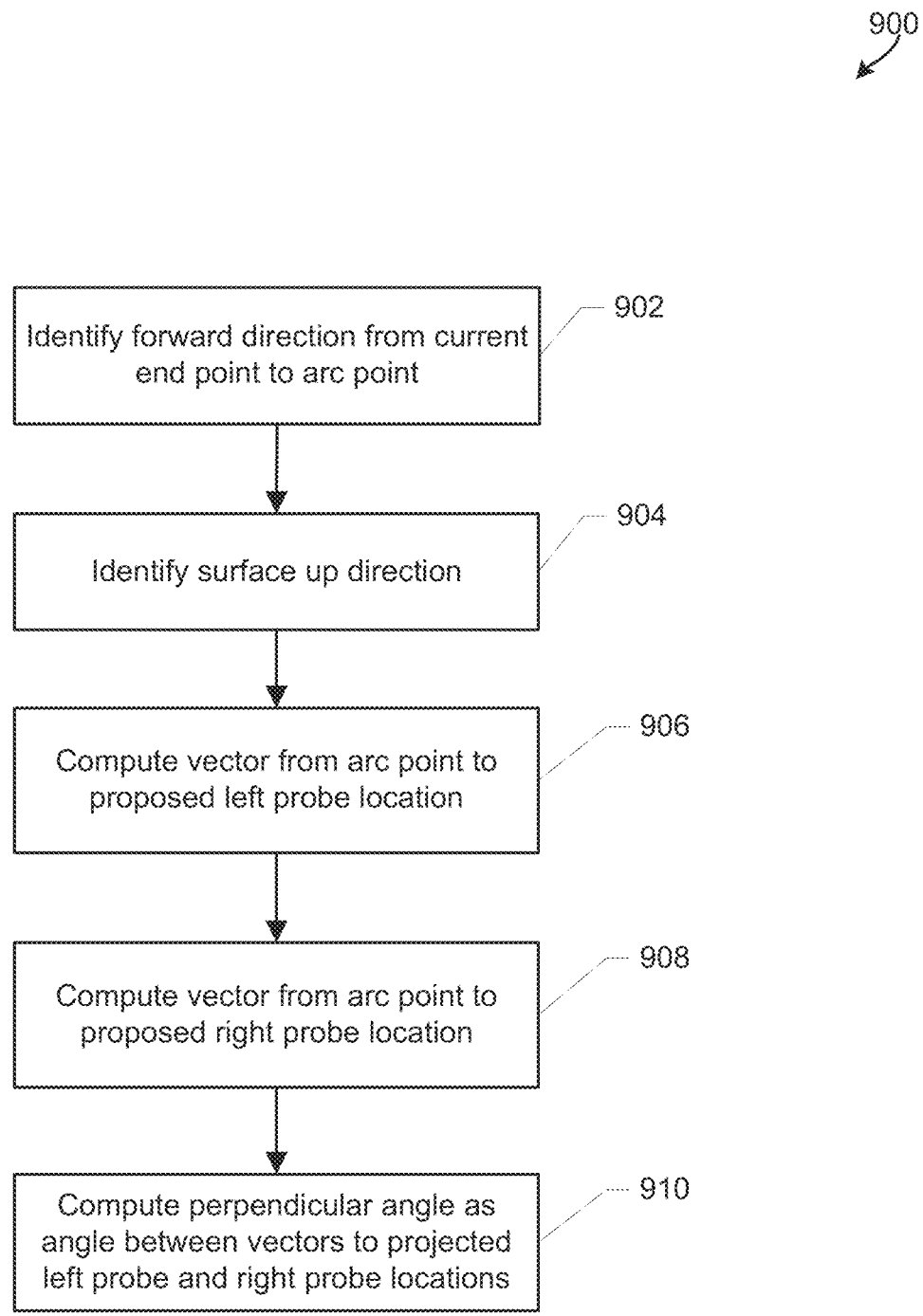
FIG. 9 is a process flow diagram illustrating a method of computing a potential line segment sample for each arc point in FIGS. 6A-6B according to various embodiments.

FIG. 9 is a process flow diagram illustrating an example method 900 for performing the step of computing a potential line segment sample (e.g., block 610 in FIG. 6) for one of the series of arc points shown in FIG. 7 (e.g., 702*a-d*). In block 902, the component of the computing device (e.g., the CPU and/or the GPU) may identify a forward direction from the current end point to the arc point. In some embodiments, the current end point may the second user input point 504.

In block 904, the component of the computing device (e.g., the CPU and/or the GPU) may identify a surface "up" direction at the arc point. In various embodiments, the "up" direction may be the "up" direction in an earthworks application, or may be surface normal (i.e., that approximately points away from a surface of the Earth) in other 3D applications.

The component may also compute location points of two projected probes on the surface sent in the left and right directions from the arc point. In various embodiments, the projected positions of the left and right probe may be computed based on the identified forward direction and the surface up ray at that arc point. In various embodiments, a probe distance may be computed based on the distances between the user input points and/or another parameter (e.g., heightmap resolution, average inter-point distance for triangle meshes, etc.)

In block 906, the component of the computing device (e.g., the CPU and/or the GPU) may compute a vector from the arc point to the projected left probe location. In block 908, the component of the computing device (e.g., the CPU and/or the GPU) may compute a vector from the arc point to the projected right probe location.

In block 910, the component of the computing device (e.g., the CPU and/or the GPU) may compute a perpendicular angle as the angle between a vector from the arc point to the projected left probe location, and a vector from the arc point to the projected right probe location. In various embodiments, the perpendicular angle computed in block 910 for each arc point may be compared to a goal (e.g., an average perpendicular angle for the user input points) to identify which corresponds to a best potential line segment sample.

Figure 10:
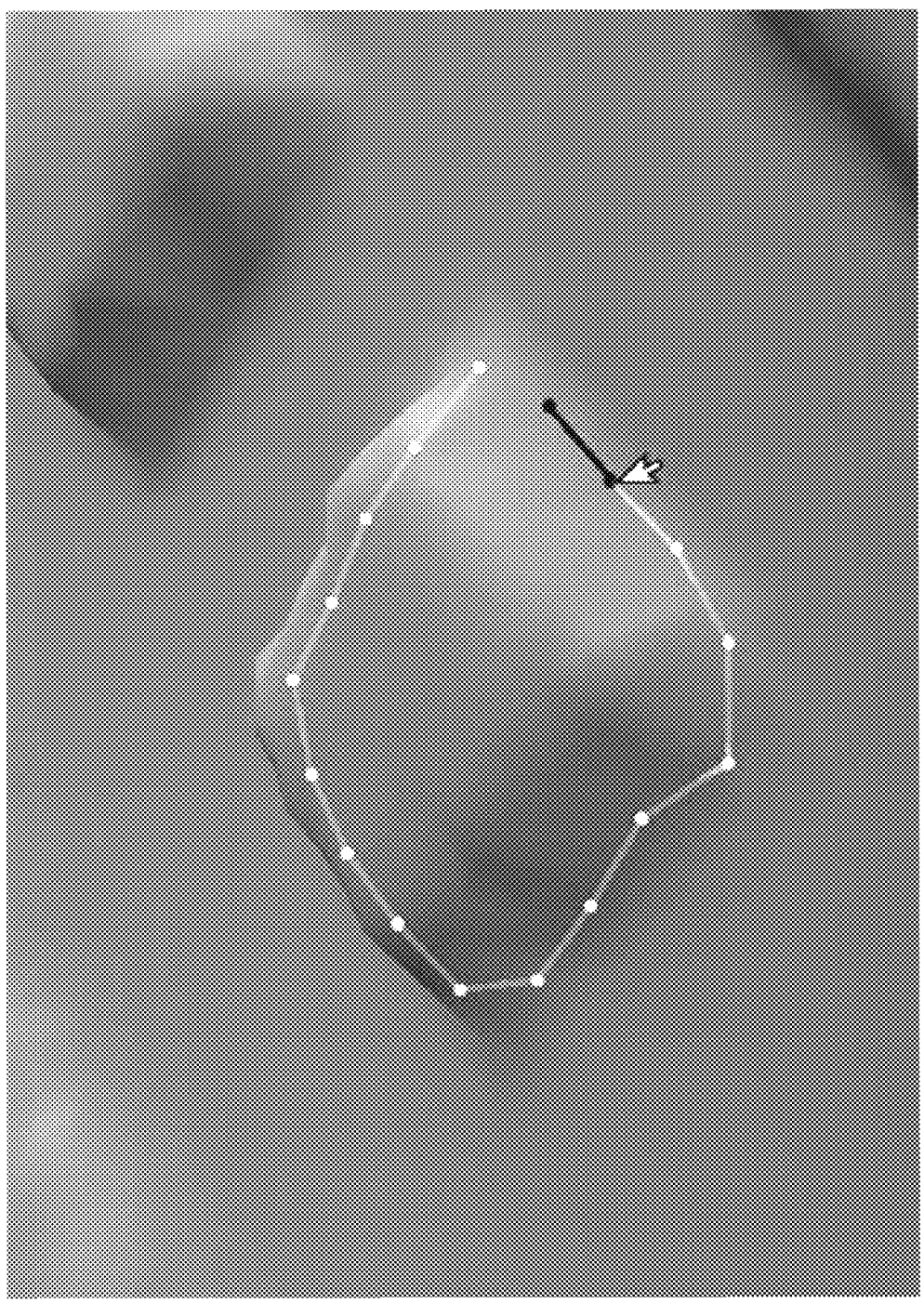
FIG. 10 illustrates a breakline around the base of a stockpile as a stop condition is reached for extending a rendered line over a surface according to various embodiments

In various embodiments, a stop condition may include checking to see if a maximum distance or point count has been reached. In some embodiments, the stop condition may be that the extrapolated samples form a loop based on the distance between the latest extrapolated end point of the breakline and other points line not directly preceding the end point. FIG. 10 shows a surface map 1000 in which such a stop condition has been reached for a breakline around the base of a stockpile. In other embodiments, the stop condition may include the extrapolated breakline reaching an end of the surface data, the latest extrapolated end point reaching a known wall, edge, or other geographic barrier, etc.

Figure 11A:
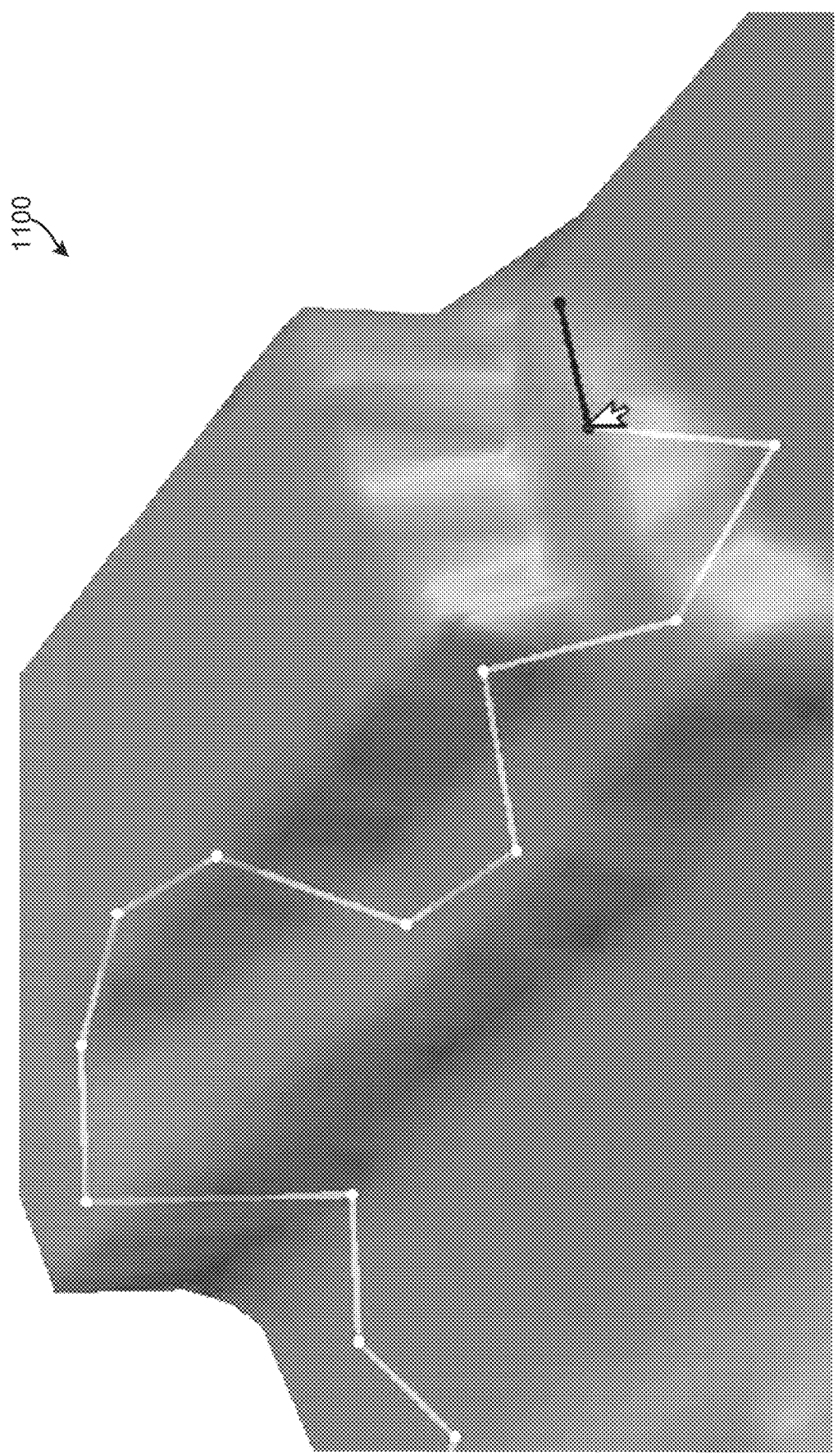
FIGS. 11A and 11B illustrate an extrapolation of a line over a surface that does not follow a road.
Figure 11B:
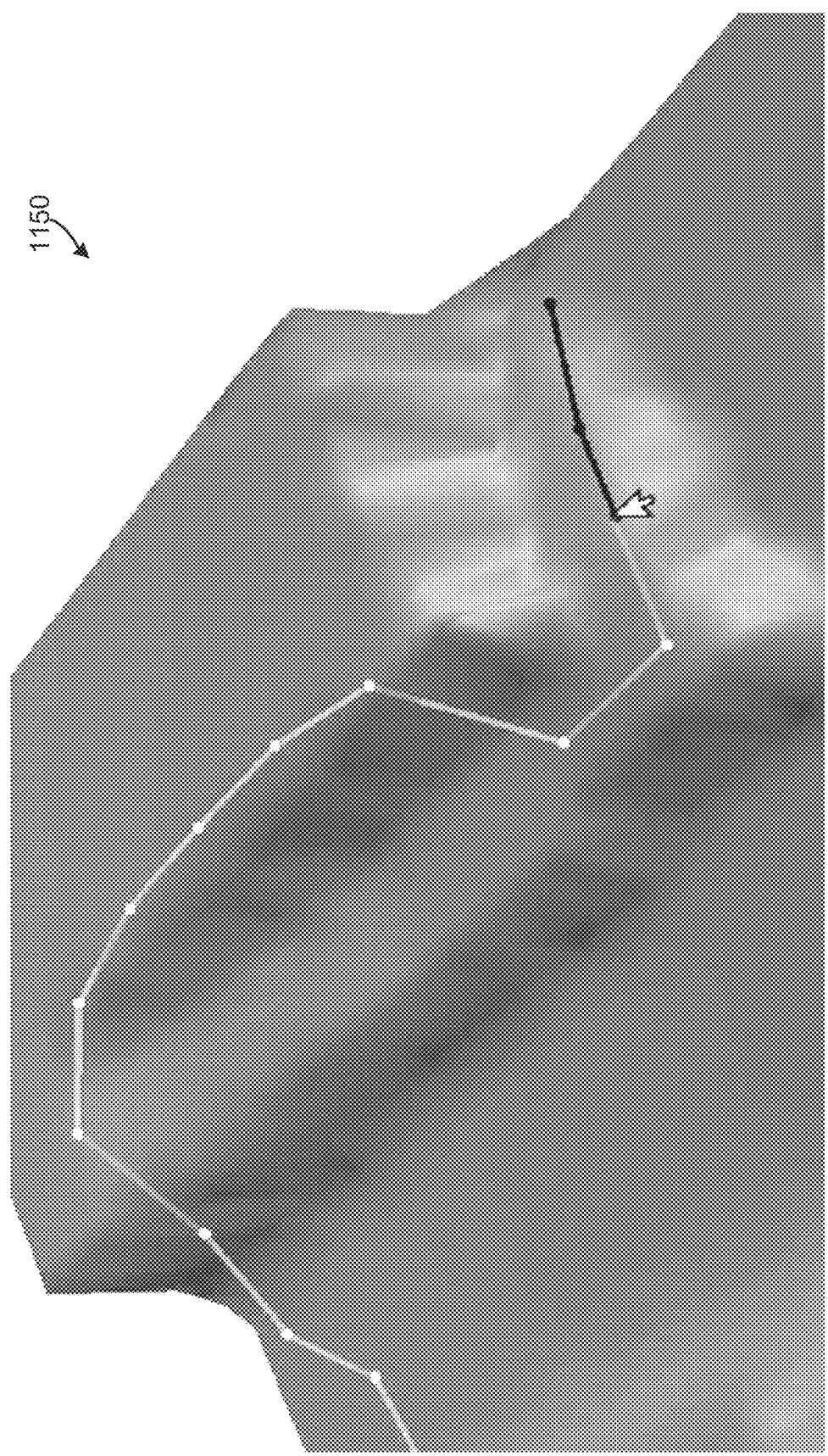
Figure 12:
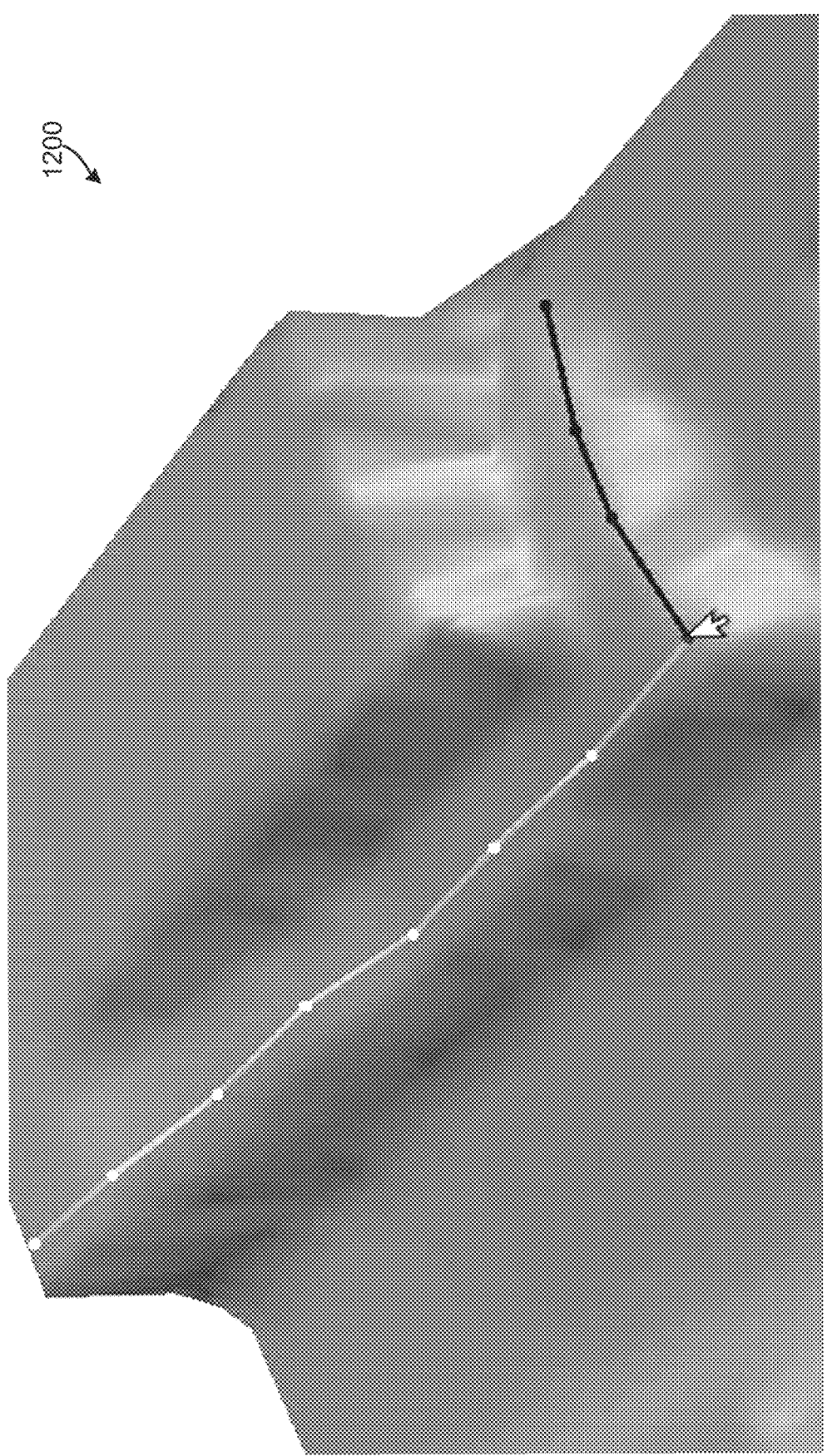
FIG. 12 illustrates a portion of an extrapolated line over a surface that is selected as acceptable by a user according to various embodiments.
Figure 13:
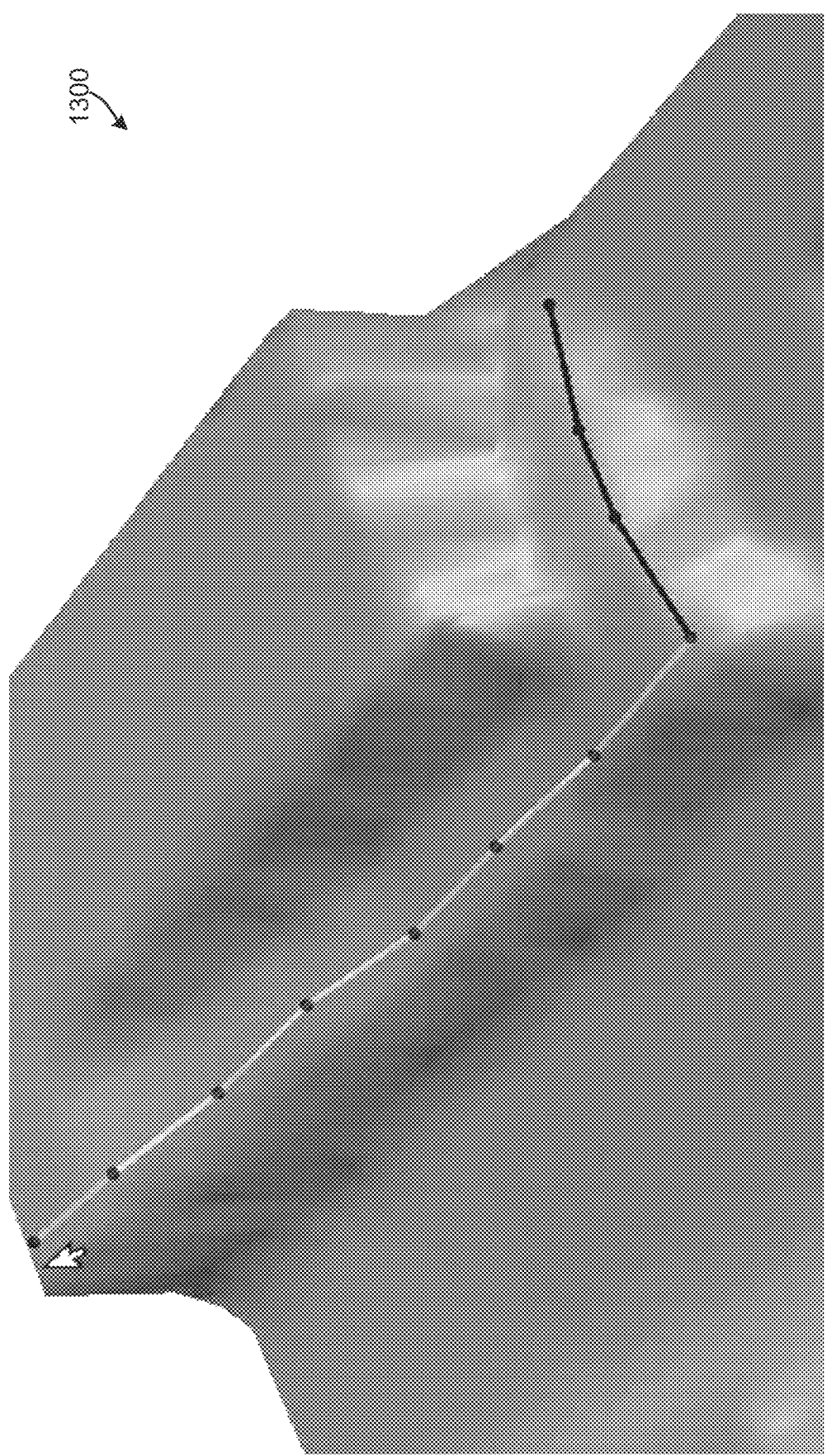
FIG. 13 illustrates a portion of an extrapolated line over a surface that is selected as acceptable by a user according to various embodiments.
Figure 14:
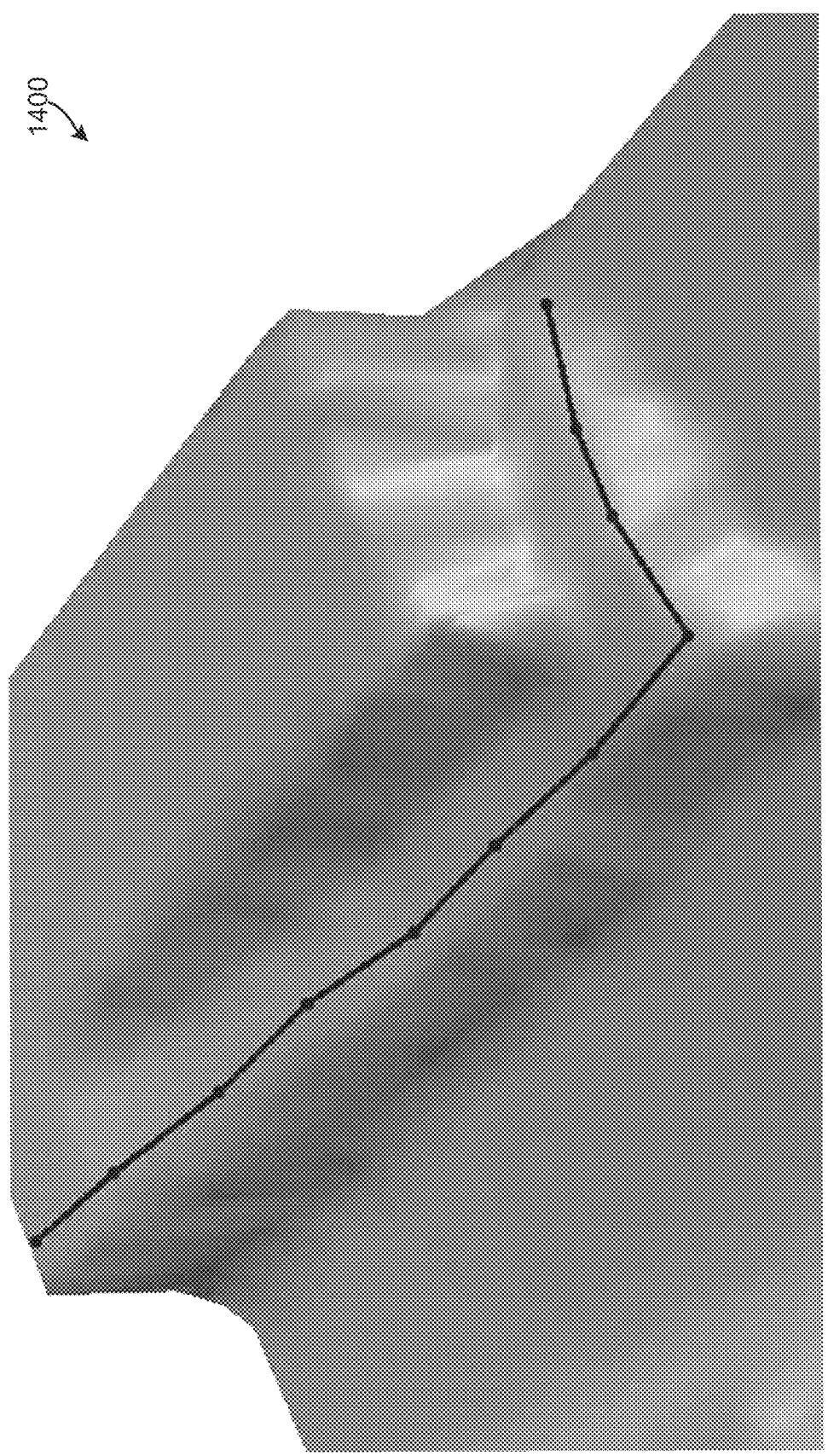
FIG. 14 illustrates a rendered line over a surface along a road that was generated by extension from user supplied points and user acceptance of extrapolated portions according to various embodiments.

In some embodiments, the user may have the opportunity to accept or reject some or all of the extrapolated next points as part of a rendered breakline based on whether such points match the outline of the terrain feature sought. For example, FIGS. 11A and 11B show surface maps 1100, 1150 in which the extrapolation of the breakline over a surface does not follow a road. Further, FIGS. 12-14 show surface maps 1200, 1300, 1400 in which some or all of an extrapolated breakline over a surface is selected as acceptable by the user.

In some embodiments, the criteria (i.e., goal) used to evaluate and select the "best" arc point may be updated with each additional sample extrapolated. For example, embodiment methods may keep track of the changes in elevation observed so far and disqualify candidate samples in each step if the sample changes elevation much more rapidly.

In various embodiments, methods of using offset probes may produce more predictable extrapolations than a method that examines other surface geometry information such as the slope and the derivatives of slope. Other surface information may be useful as well, for example, surface color.

Various embodiments described herein may enable non-pixel based line creation based on user selection of two or more points. In various embodiments, height differences at points, rather than pixel differences, may be used to define elements in a surface and render lines extending from the user selected points along and/or around, completely or partially, those elements in the surface.

Figure 15:
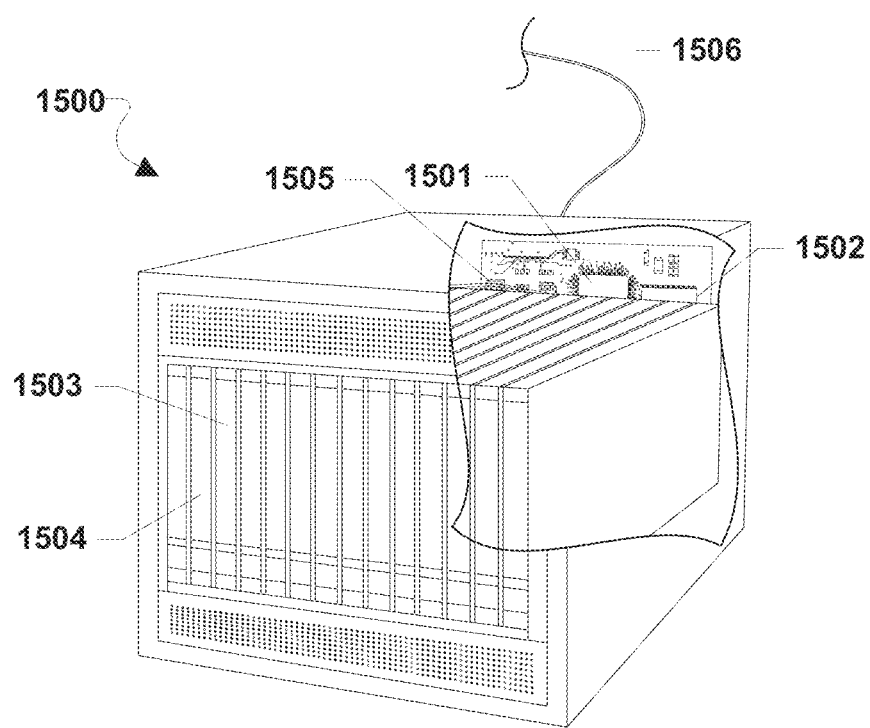
FIG. 15 is a component block diagram of a server that is a computing device suitable for use in the various embodiments.

The various embodiment methods may also be performed partially or completely on a variety of computing devices, such as a server. Such embodiments may be implemented on any of a variety of commercially available server devices, such as the server 1500 illustrated in FIG. 15. Such a server 1500 typically includes a processor 1501 coupled to internal memory 1502 (e.g., volatile memory) and a large capacity nonvolatile memory 1503, such as a disk drive. The server 1500 may also include a floppy disc drive, compact disc (CD) or DVD disc drive 1504 coupled to the processor 1501. The server 1500 may also include network access ports 1505 coupled to the processor 1501 for establishing data connections with a network 1506, such as a local area network coupled to other broadcast system computers and servers. The processor 1501 may be any programmable microprocessor, microcomputer or multiple processor chip or chips that may be configured by software instructions (applications) to perform a variety of functions, including the functions of the various embodiments described above. Typically, software applications may be stored in the memory 1502, 1503 before they are accessed and loaded into the processor 1501. The processor 1501 may include internal memory sufficient to store the application software instructions.

Figure 16:
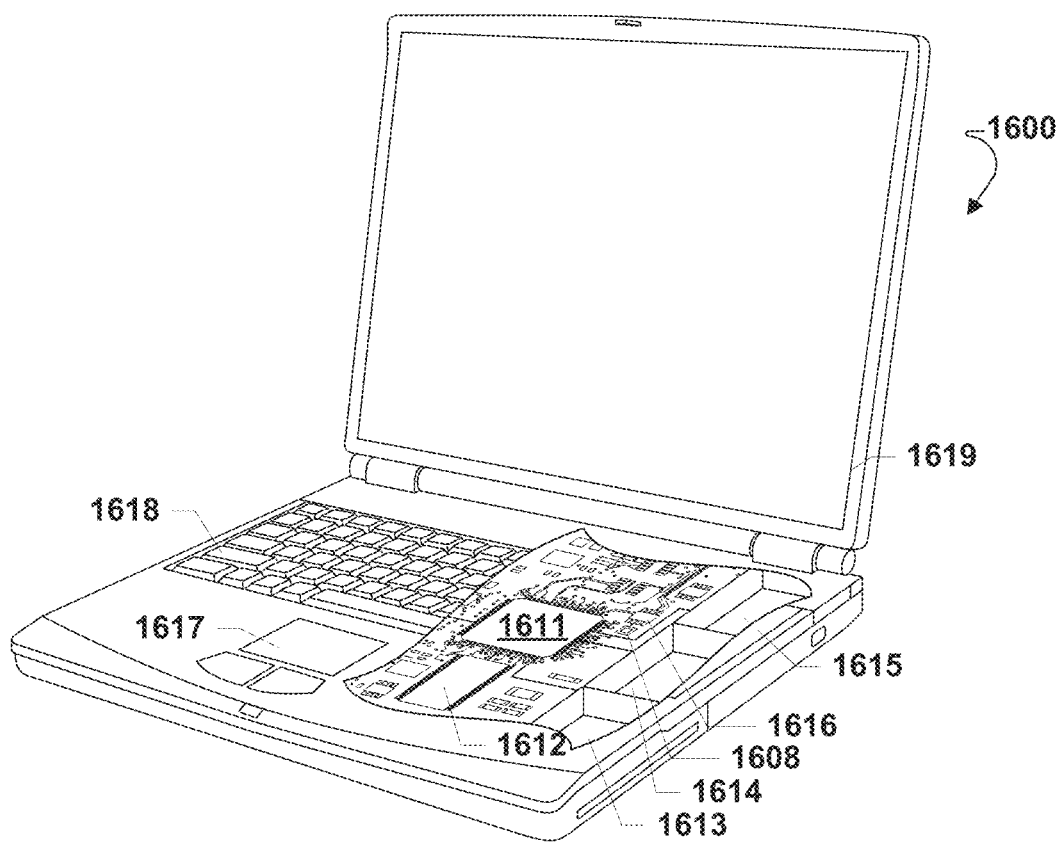
FIG. 16 is a component block diagram of a laptop that is a computing device suitable for use in the various embodiments.

The various embodiments described above may also be implemented within a variety of computing devices, such as a laptop computer 1600 illustrated in FIG. 16. Many laptop computers include a touchpad 1617 with touch surface that serves as the computer's pointing device, and thus may receive drag, scroll, and flick gestures similar to those implemented on mobile computing devices equipped with a touch screen display and described above. A laptop computer 1600 will typically include a processor 1611 coupled to volatile memory 1612 and a large capacity nonvolatile memory, such as a disk drive 1613 of Flash memory. Additionally, the laptop computer 1600 may have one or more antennas 1608 for sending and receiving electromagnetic radiation that may be connected to a wireless data link and/or cellular telephone transceiver 1616 coupled to the processor 1611. The laptop computer 1600 may also include a floppy disc drive 1614 and a compact disc (CD) drive 1615 coupled to the processor 1611. In a notebook configuration, the computer housing includes the touchpad 1617, the keyboard 1618, and the display 1619 all coupled to the processor 1611. Other configurations of the mobile computing device may include a computer mouse or trackball coupled to the processor (e.g., via a USB input) as are well known, which may also be used in conjunction with the various embodiments.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," "engine," "generator," "unit," "manager" and the like are used interchangeably herein and are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a GPU, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for extrapolating a breakline over a surface in a graphical rendering application, comprising:
   receiving a user input of a first point of the surface and a user input of a second point on the surface;
   extending a rendered line between the first point and the second point;
   computing a series of points on the surface in an arc around the second point;
   computing a potential line segment sample for each of the series of arc points;
   identifying, from among the computed potential line segment samples, a line segment sample as a potential line segment sample having a sample perpendicular angle with the smallest difference from a perpendicular angle of the rendered line;
   selecting the arc point corresponding to the identified line segment sample; and extending the rendered line from the second point to the selected arc point.

2. The method of claim 1, further comprising:
determining whether a stop condition is reached, wherein determining whether a stop condition is reached comprises determining if a predetermined point count, maximum distance, or surface boundary has been reached in the graphical rendering application; and
in response to determining that a stop condition is not reached, computing a series of points on the surface in an arc around a most recent point to which the rendered line was extended.

3. The method of claim 1, further comprising calculating a perpendicular angle of the rendered line by:
computing a forward direction of the rendered line based on the user input of the first and second points;
computing a surface ray representing an up direction at each of the first and second points;
for each of the first and second points:
  computing a location of a surface probe sent in a left direction from the point and a location of a surface probe sent in a right direction from the point, wherein the left and right probe locations are calculated based on at least the forward direction and the surface ray representing the up direction at that point; and
  computing an angle formed by a vector from the point to the left probe location and a vector from the point to the right probe location; and
combining the computed angles for the first and second points to generate the perpendicular angle.

4. The method of claim 3, wherein combining the computed angles for the first and second points comprises averaging the computed angles.

5. The method of claim 1, wherein computing the potential line segment sample comprises, for each of the series of arc points:
identifying a forward direction as from the second point to the arc point;
identifying a surface up direction at the arc point;
computing a vector from the arc point to a projected left probe location and a vector to a projected right probe location based on at least the forward direction and the surface up direction; and
computing a sample perpendicular angle as an angle between the vectors to the projected left probe and right probe locations at the arc point.

6. The method of claim 1, wherein at least one of the radius of the arc or the length of the arc is based on the user input points.

7. The method of claim 1, wherein at least one of the radius of the arc or the length of the arc is fixed.

8. The method of claim 1, wherein the graphical rendering application comprises an Earthworks application.

9. The method of claim 1, further comprising receiving additional user input points, wherein the extrapolation of the rendered line is modified based on the received additional user input points.

10. The method of claim 1, wherein the surface is a heightmap, triangle mesh, pointcloud, implicit surface, or any combination thereof.

11. A computing device comprising:
at least a first processor configured with processor-executable instructions to perform operations comprising:
receiving a user input of a first point of the surface and a user input of a second point on the surface;
extending a rendered line between the first point and the second point;
computing a series of points on the surface in an arc around the second point;
computing a potential line segment sample for each of the series of arc points;
identifying, from among the computed potential line segment samples, a line segment sample as a potential line segment sample having a sample perpendicular angle with the smallest difference from a perpendicular angle of the rendered line;
selecting the arc point corresponding to the identified line segment sample; and
extending the rendered line from the second point to the selected arc point.

12. The computing device of claim 11, wherein the first processor is configured with processor-executable instructions to perform operations further comprising:
determining whether a stop condition is reached, wherein determining whether a stop condition is reached comprises determining if a predetermined point count, maximum distance, or surface boundary has been reached in the graphical rendering application; and
in response to determining that a stop condition is not reached, computing a series of points on the surface in an arc around a most recent point to which the rendered line was extended.

13. The computing device of claim 11, wherein the first processor is configured with processor-executable instructions to perform operations further comprising calculating a perpendicular angle of the rendered line by:
computing a forward direction of the rendered line based on the user input of the first and second points;
computing a surface ray representing an up direction at each of the first and second points;
for each of the first and second points:
  computing a location of a surface probe sent in a left direction from the point and a location of a surface probe sent in a right direction from the point, wherein the left and right probe locations are calculated based on at least the forward direction and the surface ray representing the up direction at that point; and
  computing an angle formed by a vector from the point to the left probe location and a vector from the point to the right probe location; and
combining the computed angles for the first and second points to generate the perpendicular angle.

14. The computing device of claim 13, wherein the first processor is configured with processor-executable instructions to perform operations such that combining the computed angles for the first and second points comprises averaging the computed angles.

15. The computing device of claim 11, wherein the first processor is configured with processor-executable instructions to perform operations such that computing the potential line segment sample comprises, for each of the series of arc points:
identifying a forward direction as from the second point to the arc point;
identifying a surface up direction at the arc point;
computing a vector from the arc point to a projected left probe location and a vector to a projected right probe location based on at least the forward direction and the surface up direction; and computing a sample perpendicular angle as an angle between the vectors to the projected left probe and right probe locations at the arc point.

16. The computing device of claim 11, wherein the first processor is configured with processor-executable instructions to perform operations such that at least one of the radius of the arc or the length of the arc is based on the user input points.

17. The computing device of claim 11, wherein the first processor is configured with processor-executable instructions to perform operations such that at least one of the radius of the arc or the length of the arc is fixed.

18. The computing device of claim 11, wherein the graphical rendering application comprises an Earthworks application.

19. A non-transitory processor readable medium having processor executable instructions stored thereon configured to cause a processor to perform operations comprising:
receiving a user input of a first point of the surface and a user input of a second point on the surface;
extending a rendered line between the first point and the second point;
computing a series of points on the surface in an arc around the second point;
computing a potential line segment sample for each of the series of arc points;
identifying, from among the computed potential line segment samples, a line segment sample as a potential line segment sample having a sample perpendicular angle with the smallest difference from a perpendicular angle of the rendered line;
selecting the arc point corresponding to the identified line segment sample; and
extending the rendered line from the second point to the selected arc point.

20. The non-transitory processor readable medium of claim 19, wherein the processor executable instructions are configured to cause a processor to perform operations further comprising:
determining whether a stop condition is reached, wherein determining whether a stop condition is reached comprises determining if a predetermined point count, maximum distance, or surface boundary has been reached in the graphical rendering application; and
in response to determining that a stop condition is not reached, computing a series of points on the surface in an arc around a most recent point to which the rendered line was extended.

21. The non-transitory processor readable medium of claim 19, wherein the processor executable instructions are configured to cause a processor to perform operations further comprising calculating a perpendicular angle of the rendered line by:
computing a forward direction of the rendered line based on the user input of the first and second points;
computing a surface ray representing an up direction at each of the first and second points;
for each of the first and second points:
computing a location of a surface probe sent in a left direction from the point and a location of a surface probe sent in a right direction from the point, wherein the left and right probe locations are calculated based on at least the forward direction and the surface ray representing the up direction at that point; and
computing an angle formed by a vector from the point to the left probe location and a vector from the point to the right probe location; and
combining the computed angles for the first and second points to generate the perpendicular angle.

22. The non-transitory processor readable medium of claim 21, wherein the processor executable instructions are configured to cause a processor to perform operations such that combining the computed angles for the first and second points comprises averaging the computed angles.

23. The non-transitory processor readable medium of claim 19, wherein the processor executable instructions are configured to cause a processor to perform operations such that computing the potential line segment sample comprises, for each of the series of arc points:
identifying a forward direction as from the second point to the arc point;
identifying a surface up direction at the arc point;
computing a vector from the arc point to a projected left probe location and a vector to a projected right probe location based on at least the forward direction and the surface up direction; and
computing a sample perpendicular angle as an angle between the vectors to the projected left probe and right probe locations at the arc point.

24. The non-transitory processor readable medium of claim 19, wherein the processor executable instructions are configured to cause a processor to perform operations such that at least one of the radius of the arc or the length of the arc is based on the user input points.

* * * * *